United States Patent [19]
Tammone

[11] 3,924,340
[45] Dec. 9, 1975

[54] BLACKJACK TEACHING DEVICE
[76] Inventor: John M. Tammone, 14282 Utrillo, Irvine, Calif. 92705
[22] Filed: July 26, 1974
[21] Appl. No.: 492,051

[52] U.S. Cl............................ 35/8 B; 35/77; 40/77.8
[51] Int. Cl.²......................................... G09B 19/22
[58] Field of Search.......... 35/8 B, 74, 76, 77, 31 A, 35/35 F, 35 G; 40/68, 70 R, 77.8

[56] References Cited
UNITED STATES PATENTS

| | | | |
|---|---|---|---|
| 1,486,313 | 3/1924 | Van Antwerp | 40/68 X |
| 3,210,866 | 10/1965 | Brunelle | 40/70 R X |
| 3,333,356 | 8/1967 | Bosland | 40/68 X |
| 3,689,071 | 9/1972 | Kucera | 35/8 B X |
| 3,722,110 | 3/1973 | Morrisey | 35/77 X |

OTHER PUBLICATIONS
Scarne's Complete Guide to Gambling, 1961, pp. 1 and 337–342.

*Primary Examiner*—Wm. H. Grieb
*Attorney, Agent, or Firm*—William F. McDonald

[57] ABSTRACT

The present invention relates to a device for teaching the playing of blackjack or 21 according to logic. The device comprises an outer housing having a plurality of apertures spaced therealong. A plurality of labels are provided on the outer housing, each being associated with an aperture thereon. One aperture is identified by its respective label as relating to the dealer's face card as by "dealer." Each of the other apertures is identified by its respective label or labels with a possible play by a blackjack player. A data bearing inner member is movably positioned within the outer housing. The data on the inner member is arranged in columns, each column of data being in alignment with an aperture in the outer housing. The column in alignment with the aperture labeled as relating to the dealer's face card contains indicia corresponding with the various possible face cards of the dealer in blackjack. One of such indicia is visible at a time through the aperture. Each of the other columns contains indicia indicating by blackjack point count and the like when a player should make the particular play by which the aperture through the column is visible is labeled, all based upon the indicia corresponding to the dealer's face card showing through the aperture labeled as relating to the dealer's face card.

2 Claims, 3 Drawing Figures

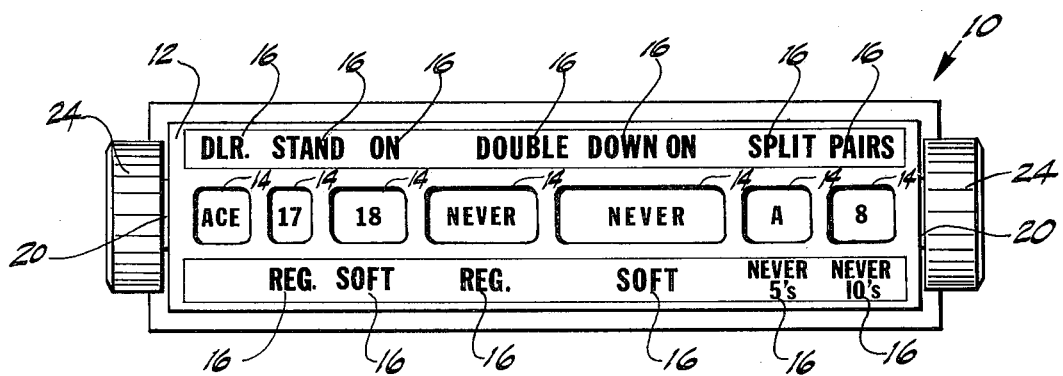
Fig. 1
| ACE | 17 | 18 | NEVER | NEVER | A | 8 |
|-----|----|----|-------|-------|---|---|
| 2 | 13 | 18 | 9-11 | NEVER | A23 | 6789 |
| 3 | 13 | 18 | 9-11 | 17 | A23 | 6789 |
| 4 | 12 | 18* | 9-11 | 17-18 | A23 | 6789 |
| 5 | 12 | 18* | 9-11 | 13-18 | A234 | 6789 |
| 6 | 12 | 18* | 9-11 | 13-18 | A23 | 6789 |
| 7 | 17 | 18 | 10-11 | NEVER | A23 | 678 |
| 8 | 17 | 18 | 10-11 | NEVER | A | 789 |
| 9 | 17 | 19 | 10-11 | NEVER | A | 89 |
| 10 | 17 | 19 | 11 | NEVER | A | 8 |
Fig. 2
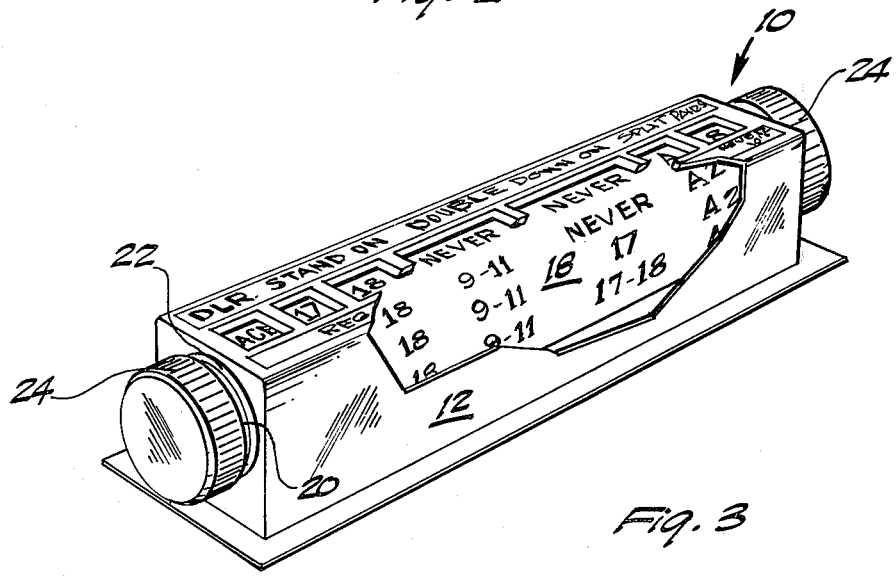
Fig. 3

1

BLACKJACK TEACHING DEVICE

BACKGROUND OF THE INVENTION

The present invention relates to devices for teaching the playing of card games logically. More specifically, it relates to teaching the playing of the card game commonly known as blackjack or 21 in a logical manner. The game of blackjack or 21 is quite popular but is also a very fast moving game. Many people play it without fully understanding the logic behind the game and hence do not play as well as they should. In the game of blackjack or 21 a score of 21 is the highest score permitted. If your score exceeds 21 you bust. However, the object of blackjack is to win i.e. have the highest hand, not to get as close to 21 as possible. Most people tend to make the mistake of trying to get as close to 21 as possible and thereby put themselves into a busting situation. Thus, there 38manner to give the average player a better chance in the game. Blackjack simulators have been developed in the past to increase one's expertise in the game but they do not provide a device which one can utilize in an actual game of blackjack to improve one's playing thereby teaching the player as he goes along.

SUMMARY OF THE INVENTION

It is an object of the present invention to provide a blackjack or 21 teaching device that will permit the average player to greatly improve his skill at the game. It is an advantage of the present invention that the device is compact, easy to use and can be referred to while one is playing an actual game of blackjack. The present device approaches the playing of blackjack in a logical manner and teaches the player the true object of blackjack, i.e. to win, not necessarily to get as close to 21 as possible. It is an advantage of the present invention that by utilizing it as a teaching device one will learn that one does not necessarily need a good hand to win and it will teach a player how to win with an average, or in some circumstances even a poor, hand.

The present invention relates to a device for teaching the playing of blackjack according to logic and comprises an outer housing having a plurality of apertures spaced therealong. A plurality of labels are on the outer housing, each associated with an aperture thereon. One aperture is identified by its respective label as relating to the dealer's face card as by "dealer" or a similar indicia, and each of the other apertures is identified by its respective label or labels with a possible play by a blackjack player. A data bearing inner member is movably positioned within the outer housing. The data thereon is arranged in columns and each column of data is in alignment with an aperture in the outer housing. The column in alignment with the aperture labeled "dealer" contains indicia corresponding to the various possible face cards of the dealer in blackjack. One of such indicia is visible at a time through the aperture. Each of the other columns contains indicia indicating by blackjack point count and the like when a player should make a particular play by which the aperture through which the column is visible is labeled, based upon the indicia corresponding to the dealer's face card showing through the aperture identified by its label with the dealer's face card.

Other objects and advantages of the present invention will be apparent from the following detailed description taken in conjunction with the accompanying drawings.

BRIEF DESCRIPTION OF THE DRAWINGS

The accompanying drawings are illustrative of advantageous embodiments of this invention.

FIG. 1 is a front plan view of a blackjack teaching device according to the present invention.

FIG. 2 is a layout of the data bearing inner member of the blackjack teaching device shown in FIG. 1.

FIG. 3 is a perspective view of the blackjack teaching device of FIG. 1, with parts cutaway and with some parts removed for purposes of clarity.

Throughout the drawings corresponding reference numerals have been used for corresponding parts.

DETAILED DESCRIPTION

There are certain fundamental rules and regulations with respect to blackjack or 21 as it is sometimes called. Some of these rules and regulations are imposed by the casinos and others are imposed by common sense and the laws of probability, i.e. logic. With respect to the fundamental rules, certain things should be understood.

If a player receives a pair of numerically identical cards as his two original down or hole cards he may elect to either play those two cards or to split these numerically identical cards. If he plays them, as with any other two cards, he has the usual options of the game i.e. to stand, draw, double down and the like. If he elects to split, he in effect forms two hands from the original one hand. Each of the split cards from the pair is the nucleus of a new hand and the betting is now in two hands. The dealer will, when the hand is split, deal additional cards to each of the split cards. Normally the player would place a second bet on the second hand formed by the splitting and the dealer would deal each half of the split hand an additional card face down, the original numerically identical pair, now a split pair, being face up on the table. Then the player plays one hand to completion before he begins to play the second hand of the split pair.

A count is hard when the ace must be counted as one point to keep the hand from exceeding 21 or busting. If you can count the ace as 11 points without exceeding a 21 count then you have a soft hand.

A dealer must hit a stiff hand under 17. He is not allowed to exercise his judgment the way the rest of the players are.

Referring now to the drawings, one sees that the present invention relates to a device for teaching the playing of blackjack indicated generally as 10. The device includes an outer housing 12 having a plurality of apertures 14 spaced therealong. In the embodiments shown, outer housing 12 is in the form of a hollow container. A plurality of labels 16 are provided on outer housing 12. Each label 16 is associated with an aperture 14 on outer housing 12. One aperture 14 is identified by its respective label 16 as relating to the dealer's face card as by "dealer" or a permutation thereof (here DLR.) or the like. Each of the other apertures 14 is identified by its respective label or labels 16 with a possible play by the blackjack player.

An inner member 18 shown here in the form of a cylinder is movably positioned within outer housing 12. Inner member 18 is shown laid out in FIG. 2 and its preferred cylindrical character is apparent in FIG. 3. Inner member 18 is rotatably mounted in outer housing 12 in an appropriate manner as by shafts 20 extending therefrom through appropriate openings 22 in outer housing 12. The shafts 20 are free to rotate in openings 22 and with them of course inner member 18. Shafts 20 terminate in knobs 24 which may be used to rotate inner member 18 within outer housing 12.

Inner member 18 bears data thereon, the data being arranged in straight columns 26. Each column 26 of data is in alignment with an aperture 14 in outer housing 12. The column 26 in alignment with the aperture 14 labeled DLR. contains indicia corresponding to the various possible face cards of the dealer in blackjack. As can be seen in the figures, only one of such indicia is visible at a time through the aperture 14. Each of the other columns 26 contains indicia indicating by blackjack point count and the like, including some instructions in words, when a player should make the particular play by which the aperture through which the column is visible is labeled, based upon the indicia corresponding to the dealer's face card showing through the aperture 14 labeled DLR.

In the embodiment shown, apertures 14 other than that identified by its label 16 as relating to the dealer's face card are grouped in pairs. Each pair of apertures 14 has a main label 16 for the pair and sublabels 16 for each of the individual apertures 14 in the pair.

In the embodiment shown, the main labels 16 for the pairs are "stand on," "double down on," and "split pairs." The corresponding sublabels 16 for each of the individual apertures 14 in each pair in the same order are "reg." or "regular," "soft," "reg." or "regular," "soft," "never five(s)," and "never ten(s)."

A pair of tens, i.e. 20 is the second best hand one can have so one would not want to split them. A pair of fives enables you to double down when otherwise appropriate so one would never want to split fives.

Always take advantage of the double down situations when the dealer's face cards are 2 through 6. If player's down cards equal a 9 to 11 count, the player turns over the face cards, doubles the original bet played, and calls for one down card only. On the splitting of pairs, if, when the pair is split by the player, the first card dealt by the dealer to one of the split pairs causes a total on that to be 9, 10, 11 then a better strategy would be to add another increment of that bet and double down. As the dealer's face card becomes higher the changes of doubling down become less.

An explanation of how the device is utilized in teaching a player to improve his skill at blackjack by playing logically will assist in an understanding of the present invention.

Remembering that a soft hand is one dealt to a player wherein one of the two cards is an ace which can be counted as 11 without breaking 21 and that a hand wherein no ace is present or if an ace is present it is counted as 1 point rather than 11 explains the sublabels regular and soft. The dealer's down card must always be assumed to be a 10 count except when the dealer's face card is an ace and he does not turn over 21 or blackjack. The player notes the dealer's face card, turns the inner member 18 by means of knobs 24 to show the dealer's face card indicia through the aperture 14 identified by its label 16 with the dealer's face card. Depending then on the count of the two down cards dealt to the player the player reads through the corresponding player's aperture 14 which will give the player the logical move to make and a better percentage to win.

When the dealer's face cards are 2, 3, 4, 5, or 6, better known as a breaking hand, the player has the best percentage advantage to win. The indicia arranged in columns 26 on inner member 18 corresponding to those face cards of the dealer will tell the player, when the dealer's face cards are 2 or 3 to stand on 13 with a regular hand and to stand on 18 with a soft hand. The player should stand on 12 with a regular hand when the dealer's face cards are 4, 5, or 6, and should stand on 18 when the dealer's face cards are 4, 5, or 6, with a soft hand. The player should hit all soft hands if less than the indicated 18. A player cannot hurt his hand by hitting but he might improve it. If a soft hand is 18 in 2 cards when the dealer's face cards are 4, 5, or 6, the asterisks relate to the fact that the dealer's biggest percentage to bust or break occurs. Therefore the better strategy for the player is to double down as indicated through the corresponding apertures 14.

As taught by the teaching device 10, the player might also advantageously split the pairs as indicated when the dealer's face cards are 2 through ace.

When the dealer's face cards are 7, 8, 9, 10, or ace, better known as standing hands, then the device will advise the player to draw to 16 and stand on 17.

If the player has a soft hand, he should hit all soft hands of 16 or less and stand on 18 if the dealer's face card is ace, 7, or 8, and stand on 19 if the dealer's face card is 9 or 10. The player should double down only as shown i.e. he should not double down at all with a soft hand and should double down with a regular hand only with a point count of 10—11 when the dealer's face card is 7, 8, or 9, double down on 11 if the dealer's face card is a 10, and never double down if the dealer's face card is an ace. Similarly, the player should split pairs only as shown in the columns 26 visible through the appropriate apertures 14.

While there have been shown and described hereinabove possible embodiments of the present invention it should be understood that the present invention is not limited thereto. Various changes, alterations, modifications, and variations are possible without departing from the spirit and scope of the present invention. Accordingly, the present invention is to be defined only by the claims.

What is claimed is:

1. A device for teaching the playing of blackjack according to logic which comprises:
   a. an outer housing having a plurality of apertures spaced therealong;
   b. a plurality of labels on the outer housing, each being associated with an aperture thereon, one aperture being identified by its respective label as relating to the dealer's face card, and each of the other apertures being identified by its respective label or labels with a possible play by a blackjack player; and
   c. a data bearing inner member movably positioned within the outer housing, the data thereon being arranged in straight columns, each column being in alignment with an aperture in the outer housing, the column in alignment with the aperture labeled as relating to the dealer's face card containing indicia corresponding to the various possible face cards of the dealer in blackjack, one of such indicia being visible at a time through the aperture, each of the other columns containing indicia indicating by blackjack point count and the like when a player should make the particular play by which the aperture through which the column is visible is labeled, based upon the indicia corresponding to the dealer's face card showing through the aperture labeled as relating to the dealer's face card, and wherein the apertures other than that labeled as relating to the dealer's face card are grouped in pairs, each pair having a main label for the pair and sublabels for each of the individual apertures in the pair.

2. The device of claim 1 wherein the main labels for the pairs identify them as relating to stand on, double down on, and split pairs and the corresponding sublabels for each of the individual apertures in each pair in the same order identify them as relating to regular, soft, regular, soft, never 5's, and never 10's.

* * * * *

UNITED STATES PATENT OFFICE
CERTIFICATE OF CORRECTION

Patent No. 3,924,340        Dated December 9, 1975

Inventor(s) John M. Tammone

It is certified that error appears in the above-identified patent and that said Letters Patent are hereby corrected as shown below:

Column 1, lines 19 through 21 inclusive, the phrase "38manner" should be deleted and inserted therein should be the following --- has long been a need for a device to teach the playing of blackjack in a more logical manner ---

Signed and Sealed this thirteenth Day of April 1976

[SEAL]

Attest:

RUTH C. MASON
*Attesting Officer*

C. MARSHALL DANN
*Commissioner of Patents and Trademarks*